United States Patent [19]
Kato et al.

[11] Patent Number: 5,479,309
[45] Date of Patent: Dec. 26, 1995

[54] MAGNETIC HEAD HAVING SPACER ASSEMBLY WITH LAMINATE OF MAGNETIC AND NON-MAGNETIC MATERIAL

[75] Inventors: Minoru Kato; Yasuo Nakagawa, both of Chichibu, Japan

[73] Assignee: Canon Denshi Kabushiki Kaisha, Saitama, Japan

[21] Appl. No.: 448,971

[22] Filed: May 24, 1995

Related U.S. Application Data

[63] Continuation of Ser. No. 944,988, Sep. 15, 1992, abandoned, which is a continuation-in-part of Ser. No. 557,770, Jul. 26, 1990, Pat. No. 5,148,342.

[30] Foreign Application Priority Data

Sep. 17, 1991 [JP] Japan ................................ 3-236187

[51] Int. Cl.⁶ .................................................. G11B 5/187
[52] U.S. Cl. ............................................ 360/121; 360/122
[58] Field of Search ...................................... 360/120, 121, 360/126, 122; 29/603

[56] References Cited

U.S. PATENT DOCUMENTS

| | | | |
|---|---|---|---|
| 4,423,550 | 1/1984 | Fujioka et al. | 29/603 |
| 5,041,936 | 8/1991 | Hayakawa | 360/121 |
| 5,148,342 | 9/1992 | Kato | 360/121 |
| 5,181,150 | 1/1993 | Hayakawa et al. | 360/121 |

*Primary Examiner*—Stuart S. Levy
*Assistant Examiner*—Paul J. Ditmyer
*Attorney, Agent, or Firm*—Spencer, Frank & Schneider

[57] ABSTRACT

A magnetic head having a pair of magnetic core assemblies sandwiching a spacer assembly in a direction of track width includes a laminate consisting of a magnetic material and a nonmagnetic material in a part of the spacer assembly, and the remaining part of the spacer assembly is made of nonmagnetic materials. The spacer assembly is fabricated by forming a plurality of grooves on a surface of a magnetic material block, filling a joint material in the grooves and join the magnetic material block with a nonmagnetic material block to form a composite block, and cutting the composite block to obtain a plurality of spacer assemblies. The spacer assembly together with other elements of the magnetic head is assembled to manufacture a magnetic head.

4 Claims, 9 Drawing Sheets

MAGNETIC HEAD HAVING SPACER ASSEMBLY WITH LAMINATE OF MAGNETIC AND NON-MAGNETIC MATERIAL

This application is a continuation of application Ser. No. 07/944,288, filed Sep. 15, 1992, now abandoned, which is a continuation-in-part of application Ser. No. 07/557,770, filed Jul. 26, 1990, now U.S. Pat. No. 5,148,342.

BACKGROUND OF THE INVENTION

1. Field of the Invention

The present invention relates to a spacer assembly for use in a magnetic head, and to a magnetic head and more particularly to a magnetic head which has a pair of magnetic core assemblies arranged in parallel in a direction across the width of the track, and a spacer assembly sandwiched by the core assembly. The present invention also relates to a method for fabricating a spacer assembly for use in a magnetic head and to a method for manufacturing: such a magnetic head.

2. Description of the Prior Art

Floppy disk drives having capacities of 1 to 2 MB have been prevailing. As a result of incessant efforts for obtaining floppy disk drives with larger capacities floppy disk drives having capacities of even above 10 MB (Mega-Bits) have recently been commercialized.

One mega bits floppy-disk drives (1 MB FDD) have a maximum line recording density of 9.7 kilobit per inch (KBPI), and a track density of 135 track per inch (TPI). To achieve a capacity of above 10 MB, the floppy disk drive-must have a line recording density of 35 KBPI or more and a track density of 405 TPI to 1,000 TPI, or more, in other words both the line recording density and the track density of the floppy disk drive must be at least 3 times as high as those of a 1 MB floppy disc drive.

Here, it must be taken into consideration that compatibility between higher level (larger capacity) and lower level (smaller capacity) devices must be maintained in general use of floppy disk drives in order to maintain compatibility of softwares and data. For example, a 2 MB device reading/writing a 3.5 inch floppy disk has read/write compatibility with 1 MB device and can read/write in a format which corresponds to that of the 1 MB device. Likewise, a 4 MB device has read/write compatibility with 1 MB and 2 MB devices. Also, devices with capacities of 10 MB or more are required to record and reproduce information in formats used by the lower level counterparts, i.e., must have R/W compatibility with the lower level ones. Floppy disk drives with capacities of 1 to 4 MB share the same track density of 135 TPI so that the read/write compatibility can be maintained naturally. In contrast to this, 10 MB or more floppy disk drives with higher track densities can read out signals recorded with low level devices with lower track densities but cannot write in formats corresponding to those of the lower level devices. This results in an insufficient compatibility of softwares or programs and data with conventional ones.

To meet the requirement for the compatibility between the floppy disk drives of different track densities, the use of a composite magnetic head has been proposed which includes a magnetic core assembly of the tunnel erasing type for use in 1 to 2 MB devices and a magnetic core assembly for use in devices with capacities of 10 MB or more and different track densities, arranged in parallel via a spacer so that recording and reproducing of information can be performed. The structure of such a conventional composite magnetic head will be described with reference to FIGS. 1 to 3.

Figure 1:
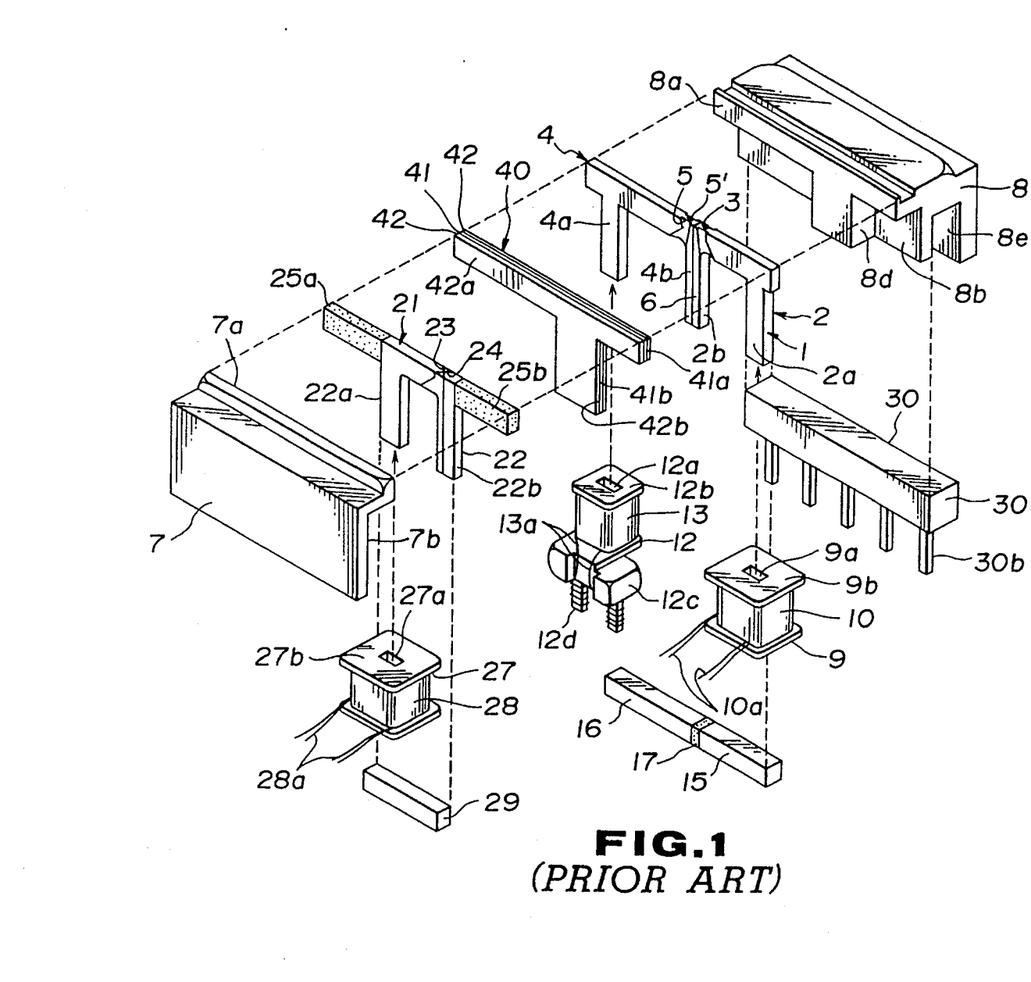
FIG. 1 is an exploded perspective view showing the construction of a conventional composite magnetic head main body.

FIG. 1 is an exploded perspective view showing the construction of the main body of a magnetic head of the aforementioned type. In FIG. 1, reference numeral 1 denotes a front core assembly (hereafter, abbreviated as "core assembly"), which is constructed as an assembly including a magnetic core 2 for recording and reproducing at a track density of 135 TPI (hereafter, referred to as "recording and reproducing core") and a magnetic core 4 for performing tunnel erasing (hereafter referred to as "erasing core"), with their front cores being coupled together via a spacer 6.

The recording and reproducing core 2 has an L-shaped front core 2a and an I-shaped front core 2b coupled with each other via a recording and reproducing gap 3, and a back core 15 connected to the rear ends (lower ends in FIG. 1) of the front cores 2a and 2b.

The erasing core has an L-shaped front core 4a and an I-shaped front core 4b coupled with each other via erasing gaps 5 and 5', and a back core 16 connected to rear ends (lower ends in FIG. 1) of the front cores 4a and 4b.

On the other hand, reference numeral 21 denotes a core assembly which includes a recording and reproducing core 22 for a higher track density (e.g., 405 to 1,000 TPI) and a back core 29 connected to the bottom end of the recording and reproducing core 22. The recording and reproducing core 22 has an L-shaped front core 22a and an I-shaped front core 22b, which have thin films 24 respectively of predetermined thicknesses made oil a high saturation flux density material such as a Fe-Al-Si alloy formed by a thin film formation technique such as sputtering or vapor deposition on the butt surfaces of the front cores 22a and 22b between which bunt surfaces a recording and reproducing gap is to be formed. Then a nonmagnetic thin film is formed on each of the thin films 24 on the front cores 22a and 22b. The front cores 22a and 22b are butted together via the nonmagnetic thin film serving as the recording and reproducing gap 23.

On both sides of the upper end of the recording and reproducing core are connected rectangular spacers 25a and 25b made of a nonmagnetic material such as a ceramic, a nonmagnetic ferrite or glass and serving as a sliding surface. Thus the core assembly 21 is constructed.

A spacer assembly 40 has a T-shaped form so that it can correspond to the upper end portions of the sides of the core assemblies 1 and 21, and to the connecting surfaces 7a and 8a of sliders 7 and 8, respectively, described later on. The spacer assembly 40 comprises a shield plate 41 made of a magnetic material and a pair of spacers 42 each made of a nonmagnetic material, sandwiching the shield plate 41. Thus, the spacer assembly is of a laminated structure.

Figure 2:
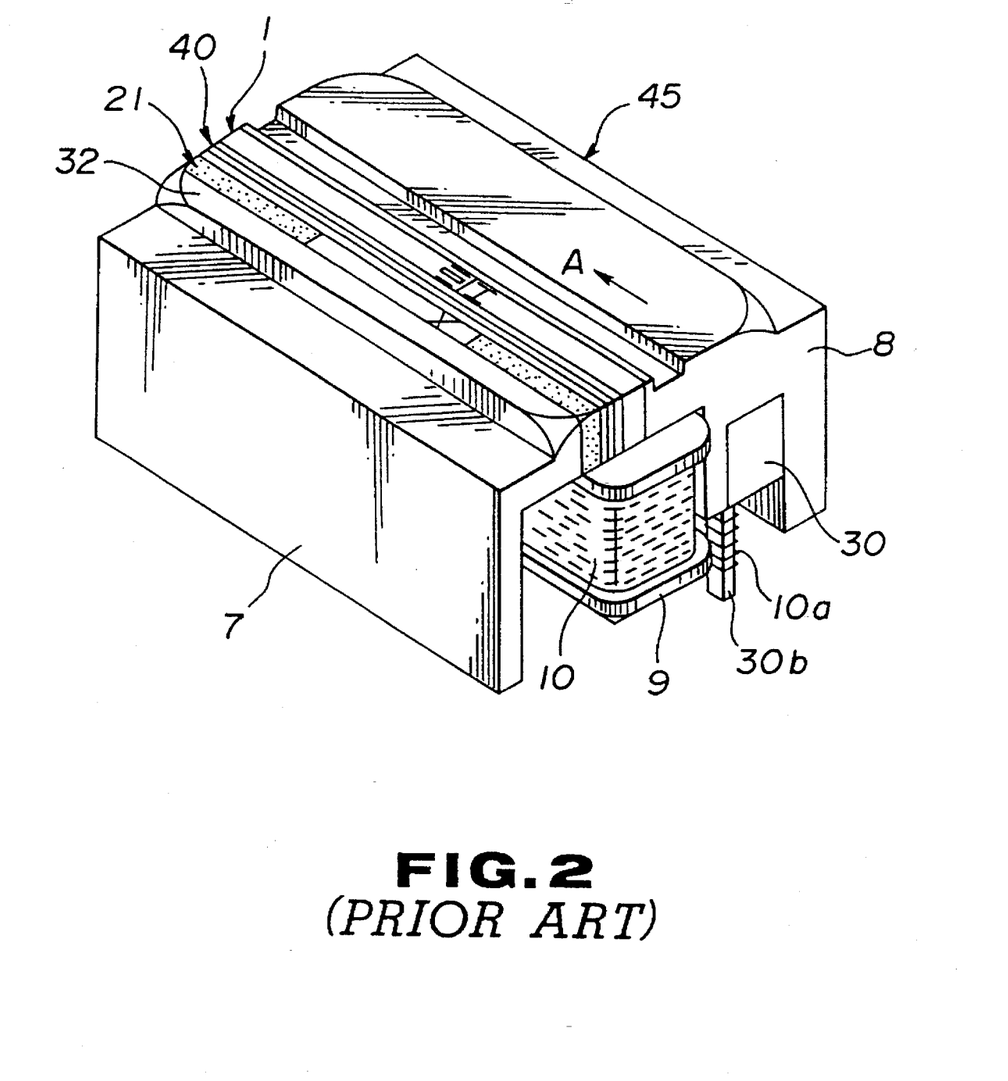
FIG. 2 is a perspective view showing the appearance of the conventional composite magnetic head main body shown in FIG. 1.

In the assembly process of a magnetic head main body 31 shown in FIG. 2, the core assemblies 1 and 21 are arranged so as to sandwich the spacer assembly 40, and the sliders 7 and 8, which are nonmagnetic, sandwich the resulting composite and the elements are bonded with an adhesive or by a conventional glass welding process.

The sliders 7 and 8, together with the core assemblies 1 and 21 and the spacer assembly 40, slide on a magnetic disk or a floppy disk (not shown) so as to stabilize the sliding of the both core assemblies 1 and 21 on the floppy disk, and to protect the core assemblies 1 and 21. The sliders 7 and 8 are made of a ceramic or the like, and are formed with notches 7b and 8b, respectively, thus taking block-like shapes having L-like cross sections, respectively, and are joined to opposite sides of the front core assemblies 1 and 21 at junction surfaces 7a and 8a which are each formed in a T-shaped form as unnotched portions.

After the sliders are attached, a coil bobbin 9 around which a recording and reproducing coil 10 is wound is mounted on the front core 2a of the core assembly 1 while a coil bobbin 12 around which a coil 13 is wound is mounted on the front core 4a of the front core assembly 1. The coil bobbin 12 has a terminal portion 12 provided integrally therewith in which terminals 12d made of a metallic material are provided as by insertion molding or pressing-in, to which coil ends 13a of the coil 13 are soldered.

Subsequently, the back cores 15 and 16 coupled together via a spacer 17 are joined to the lower ends of the legs of the front cores 2a, 2b, 4a and 4b of the front core assembly 1 to form a magnetic circuit for the magnetic core of a lower level device (lower level core).

Likewise, a coil bobbin 27 around which a recording and reproducing coil 28 is wound is mounted on the front core 22a of the core assembly 21 and the back core 29 is connected to the bottoms of the front cores 22a and 22b to form a magnetic circuit for the magnetic core of an upper level device (upper level core).

The slider 8 is formed with a groove 8e, in which a terminal assembly 30 having a terminal body 30a and a plurality of terminals 30b provided therewith is inserted and fixed. The coral ends 10a and 28a of the coils 10 and 28, respectively, wound around the coil bobbins 9 and 10, respectively, are connected to the terminals 30b to form a magnetic head main body 45 shown in FIG. 2.

Figure 3:
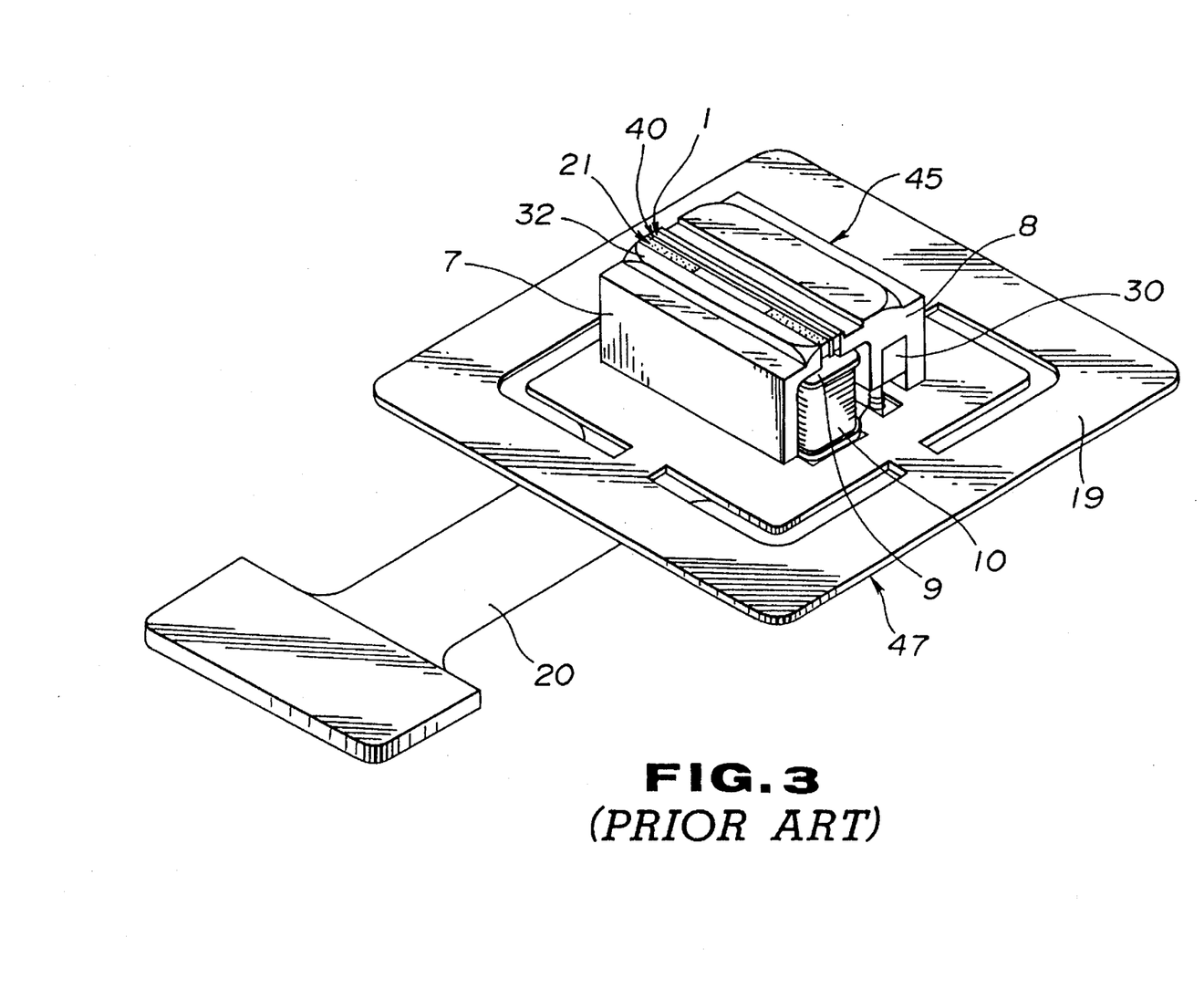
FIG. 3 is a perspective view showing the entire appearance of the arrangement of the conventional composite magnetic head including the magnetic head main body shown C in FIG. 1.

Then, as shown in FIG. 3, the magnetic head main body 45 shown in FIG. 2 is fixed on a support plate 19 made of stainless steel, beryllium copper or the like, and the terminals 12d and 30b are connected to a flexible print board 20 connected to the support plate 19. Thus a magnetic head 47 is constructed.

The magnetic head 47 thus constructed is mounted on a head carriage in a floppy disk drive (not shown) by fixing the support plate 19 thereon. Thus, the top surface of the magnetic head main body, i.e., the top surfaces of the front core assemblies 1 and 21, the spacer assembly 40 and sliders 7 and 8, together form a disk sliding surface 32, which slides on a floppy disk, thereby performing recording and reproduction. Upon recording and reproduction, the recording and reproducing core 2 and the erasing core 4 of the core assembly 1 or the recording and reproducing core 22 of the core assembly 21 is selected appropriately in accordance with the track density of the floppy disk to be written or read, which makes it possible to achieve R/W compatibility between upper and lower level devices with different track densities However, the conventional composite magnetic head 45 suffers a problem of crosstalk which is induced by magnetic leakage between the front core assemblies 1 and 21, because they are disposed in close vicinity via the spacer assembly 40 as shown in FIGS. 1 and 2.

For example, consider the case where a higher density disk (for example, 405 TPI) is replayed by a higher level floppy disk drive. In this case, the reproduction of the higher density disk is carried out by the recording and reproducing gap 23 of the core assembly 21. At the same time, however, the recording and reproducing gap 3 of the core assembly 1 which is provided for a lower density disk (for example, 135 TPI tunnel erasing type) and is placed in close proximity of the core assembly 21 will reproduce a plurality of tracks of the higher density disk. This will cause the flux through the core assembly 1 to leak into the front core assembly 21, thereby inducing crosstalk.

The crosstalk thus induced will degrade the reliability of the reread data, and presents an important problem in constructing floppy disk drives. In addition, once-crosstalk takes place, the core efficiency during the recording or reproduction reduces. This will result in an increase in current to be applied to the coil 28 in order to carry out sufficient recording, a decrease in the margin of the reproduced signal, or a decrease in resistance against noise, which requires a change of circuitry of the floppy disk drive or the design modification thereof.

The crosstalk would be prevented by the use of a construction in which the spacer assembly 40 comprises a shield plate 41 made of a magnetic material and a pair of spacers 42 each made of a nonmagnetic material and sandwiching the shield plate 41. However, this causes another problem. That is, because the core assemblies 1 and 21 are disposed in close vicinity one to another, the insertion of the shield plate made of a magnetic material leads to an increase in the leakage magnetic resistance to increase the inductances of the recording and reproduction cores 2 and 22, respectively. Increased inductances cause severe problems particularly when recording and reproduction is to be performed by the upper level core in a format for an upper level device having a capacity of 10 MB or more, since the recording frequency is high and the transmission rate is also high. For example, higher inductances cause problems such as retarding the elevation of recording wave forms.

To avoid the problems, a possible countermeasure will be to reduce the number of winding of the coil 28 to decrease the inductance. However, reduction in the number of winding of the coil results in reduction in the reproduction power, which then causes problems of noise and of necessity of increasing the level of the amplifier.

SUMMARY OF THE INVENTION

Accordingly, an object of the present invention is to provide a magnetic head having a construction which enables decreasing undesired leakage magnetic resistance and thus inductance and preventing crosstalk.

Another object of the present invention is to provide a method for manufacturing such a magnetic head.

In order to achieve the aforementioned problems, according to one aspect of the present invention, there is provided a magnetic head comprising:

a pair of front core assemblies each of which has one or more magnetic cores forming a magnetic circuit in which a magnetic gap is formed;

a spacer assembly sandwiched in a direction of a track width by the front core assemblies, the front core assemblies and the spacer assembly defining a sliding surface on which a magnetic recording medium slides, and which includes the magnetic gap of each of the front core assemblies;

wherein at least a portion of the spacer assembly is made of a laminate consisting of a magnetic material and a nonmagnetic material, and the rest portion of the spacer assembly is made of a nonmagnetic material only.

Here, the laminate may be a portion corresponding to them magnetic gap of each of the core assemblies.

Each of the core assembly may have one or more magnetic cores, and the spacer assembly may be disposed between the front cores of the front core assemblies.

The spacer assembly may have a sliding portion along the sliding surface on which the magnetic recording medium slides, and a leg portion extending in a direction perpendicular to the sliding portion, and a part of the sliding portion that contacts the leg portion may be made of the laminate.

The spacer assembly may have a sliding portion along the sliding surface on which the magnetic recording medium slides, and a leg portion extending perpendicular to the sliding portion, the leg portion being made of the laminate.

According to another aspect of the present invention, there is provided a method for manufacturing a magnetic head having a pair of front core assemblies each of which has one or more magnetic cores forming a magnetic circuit in which a magnetic gap is formed, and a spacer assembly sandwiched in a direction of a track width by the front core assemblies, the front core assemblies and the spacer assembly defining a sliding surface on which a magnetic recording medium slides, and which includes the magnetic gap of each of the front core assemblies, the method comprising the steps of:

forming a plurality of grooves on a surface of a magnetic material block;

filling a joint material in the plurality of grooves and join the magnetic material block with a nonmagnetic material block to form a composite block; and cutting the composite block, thereby obtaining a plurality of spacer assemblies.

Here, the method may further comprise the steps of:

forming a groove on a surface of the nonmagnetic material block; and arranging the magnetic material block in the groove on the surface of the nonmagnetic material block before the filling with the joining material.

The method may further comprise the step of:

sandwiching the magnetic material block by a pair of nonmagnetic material blocks before the filling with the joining material.

According to a still another aspect of the present invention, there is provided a method for fabricating a spacer assembly for a magnetic head having a pair of front core assemblies each of which has one or more magnetic cores forming a magnetic circuit in which a magnetic gap is formed, and a spacer assembly sandwiched; in a direction of a track width by the front core assemblies and the spacer assembly defining a sliding surface on which a magnetic recording medium slides, and which includes the magnetic gap of each of the front core assemblies, the method comprising the steps of:

forming a plurality of grooves on a surface of a magnetic material block;

filling a joint material in the plurality of grooves and join the magnetic material block with a nonmagnetic material block to form a composite block; and cutting the composite block, thereby obtaining a plurality of spacer assemblies.

Here, the method may further comprise the steps of:

forming a groove on a surface of the nonmagnetic material block; and arranging the magnetic material block in the groove on the surface of the nonmagnetic material block before the filling with the joining material.

The method may further comprise the step of:

sandwiching the magnetic material block by a pair of nonmagnetic material blocks before the filling with the joining material.

The magnetic head having the aforementioned construction can minimize the increase in the inductances of the two core assemblies, respectively, and efficiently prevent crosstalk between them by the use of the spacer assembly of which only a portion thereof has a laminate structure made of a magnetic material and a nonmagnetic material.

The aforementioned method for manufacturing a magnetic head, can efficiently provide a magnetic head including a spacer assembly only a portion of which is made of a laminate of a magnetic material and a nonmagnetic material.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The spacer assembly used in the magnetic head of the present invention has a horizontal beam portion and a leg portion connected to and extending from the horizontal beam portion perpendicularly so as to form a T-shaped cross section. The horizontal beam portion serves as a sliding portion. That is, its upper surface serves as a sliding surface on which a magnetic recording medium or a floppy disk slides. The spacer assembly includes a composite shielding structure or shield block which consists of a shield plate and a pair of joint material layers sandwiching the shield plate. The shield block may occupy only the horizontal beam portion or a part of the horizontal beam portion and a part or whole of the leg portion. In the latter case, the both parts may be of the same length in the sliding direction, or the part of the shield block in the horizontal beam portion or sliding portion is larger than the part of the shield block in the leg portion.

EMBODIMENTS

The invention will now be described with reference to the accompanying drawings. Here, a composite magnetic head for floppy disk drives and method for manufacturing the same are exemplified. In the following figures, like parts are designated by the same reference numerals as those in FIGS. 1 to 3 which are previously described as prior art, and the description thereof will be omitted.

Embodiment 1

Figure 4:
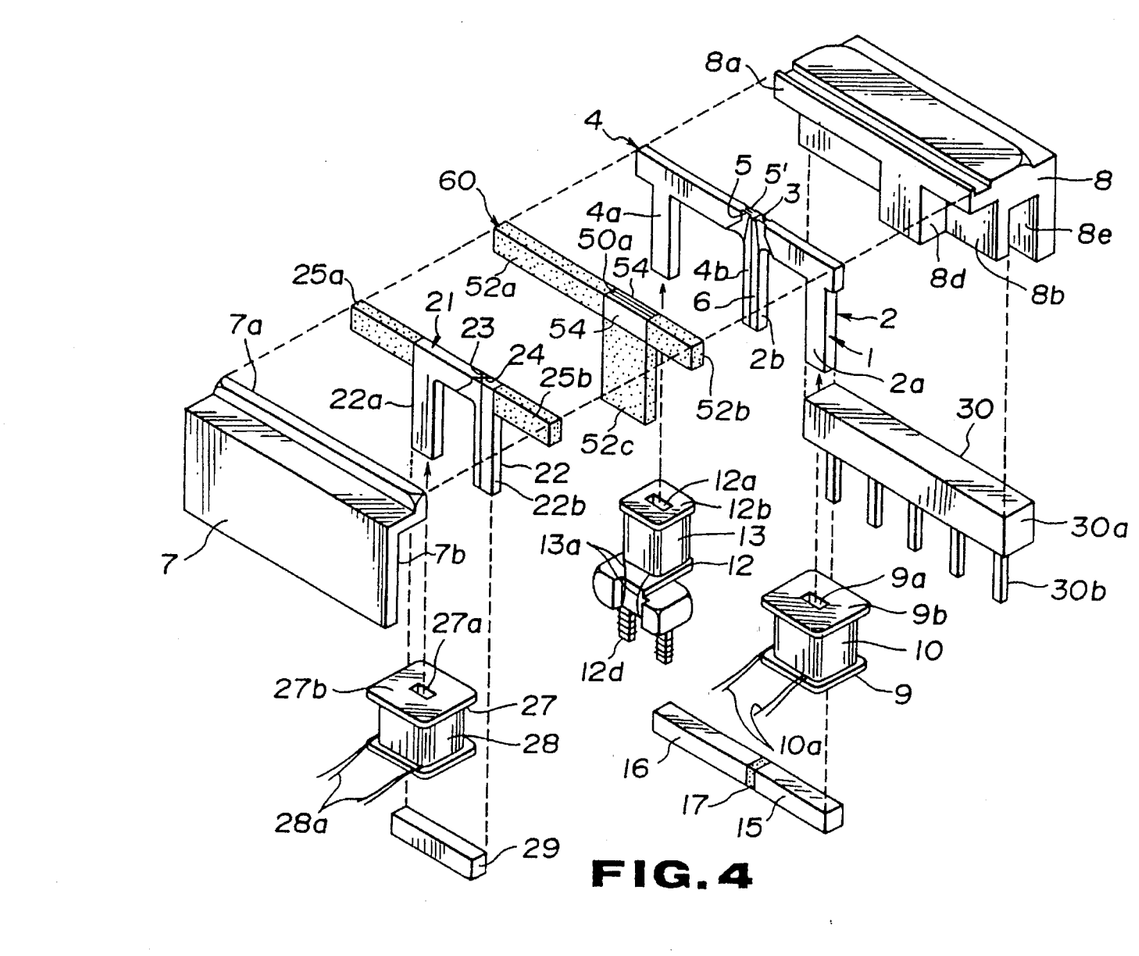
FIG. 4 is an exploded perspective view of a magnetic head main body according to the first embodiment of the present invention.
Figure 5:
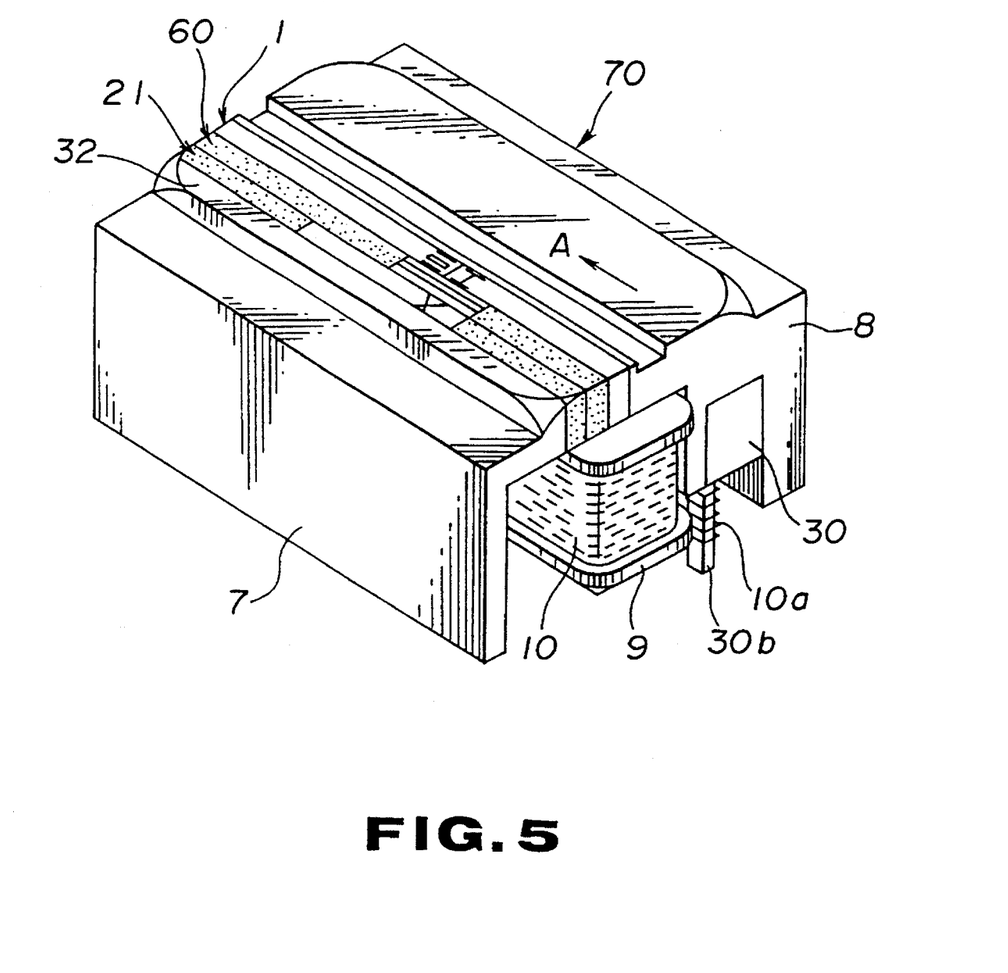
FIG. 5 is a perspective view showing the appearance of the magnetic head shown in FIG. 4.

FIGS. 4 and 5 are perspective views showing the construction of the main body of a composite magnetic head for floppy disk drives fabricated by the method of a first embodiment of the present invention. The magnetic head main body shown in FIGS. 4 and 5 differs from the conventional one shown in FIGS. 1 and 2 in the structure of the spacer assembly.

More specifically, the spacer assembly 40 of the conventional magnetic head main body has the shield plate 41 sandwiched by the spacers 42. The shield plate 41 included in the top portions or sliding portions of the core assemblies 1 and 21, which slide on a magnetic disk in the direction of the arrow A in FIG. 2, has the same length in that direction as that of the recording and reproducing core 2 of the tunnel erasing type plus that of the erasing core 4, both constituting the core assembly 1.

In contrast thereto, the spacer assembly 60 according to the present embodiment includes a shield block having a shield plate 50a made of a magnetic material sandwiched by joint material layers 54, and three nonmagnetic material blocks two of them being connected to the both longitudinal ends of the shield block and the rest being connected to the lower oblong side of the shield block, thereby forming a T-shaped structure. The shield plate 50a included in the top portion sliding portion of the spacer assembly 60, which slides on a magnetic disk in the direction of an arrow A in FIG. 5, has a length in that direction shorter than that of the core assembly 1.

Next, the fabrication process of the spacer assembly 60 will be described with reference to FIGS. 6A through 6F. FIGS. 6A through 6F are perspective views illustrating the fabrication steps of the spacer assembly 60 which is used to form the composite magnetic head of the present invention.

Figures 6A, 6C:
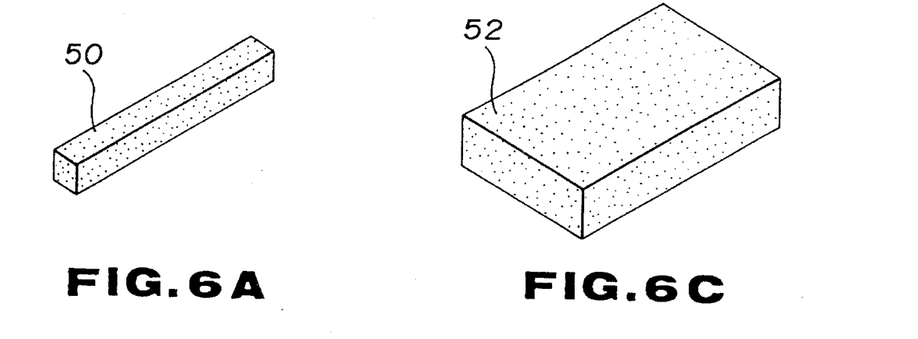
FIGS. 6A through 6F are perspective views illustrating the fabrication steps of the spacer in the magnetic head shown in FIG. 4.
Figure 6B:
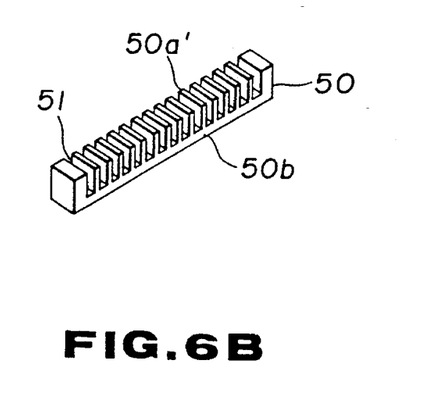
Figure 6D:
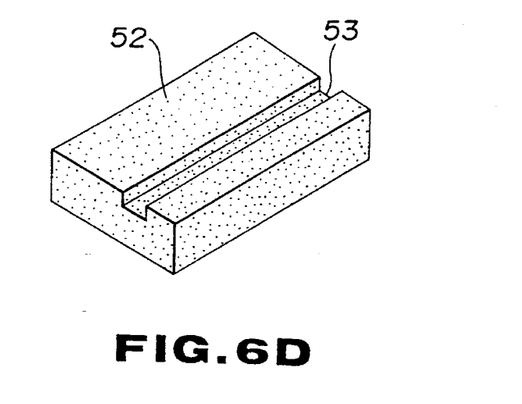
Figure 6E:
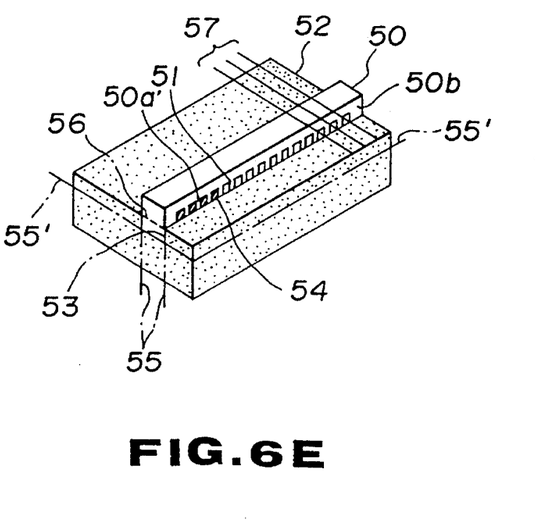

FIG. 6A shows a magnetic material board 50 made from a high-permeability material such as a ferrite. The block 50, which is a material to be used for fabricating a plurality of shield plates 50a therefrom, has a shape of rectangular block. Then, as shown in FIG. 6B, the magnetic material block 50 is cut or otherwise processed to form therein a plurality of straight-line grooves 51 rectangular in cross section to give rise to a comb-like structure having a plurality of thin plates, i.e., shield plate precursors 50a' connected together by a connecting portion 50b. On the other hand, FIG. 6C shows a nonmagnetic material block 52, which is made of a nonmagnetic material such as a ceramic, a nonmagnetic ferrite or glass. The nonmagnetic material block gives an overall configuration to the spacer assembly 60; it has the same width as the core assembly 1. The nonmagnetic material block 52 is formed with a straight line groove 53 rectangular in cross section as shown in FIG. 6D. The groove 53 has a width which is equal to that of the magnetic material block 50, and a depth smaller than the height of the magnetic material block 50 (the depth of the groove 51 or the height of the shield plate precursor 50a' plus the thickness of the connecting portion 50b). Then, as illustrated in FIG. 6E, the processed magnetic material block 50 is fitted in the groove 53 of the nonmagnetic material block 52 in such a manner that the top ends of the shield plate precursor 50a' are inserted and placed on the bottom of the groove 53 and the connecting portion 50b and the bottom portions of the grooves 51 emerge from the groove 53 so that they can be seen from outside. In other words, the block 50 shown in FIG. 6B is fitted upside down in the groove 53 of the block 52 in FIG. 6D and the connecting portion 50b is upper in FIG. 6E. In this state, the block 50 is fixed temporary, and then a joint material 54 is filled in the grooves 51 and 53 to joint the magnetic material block and the nonmagnetic material block.

Figure 6F:
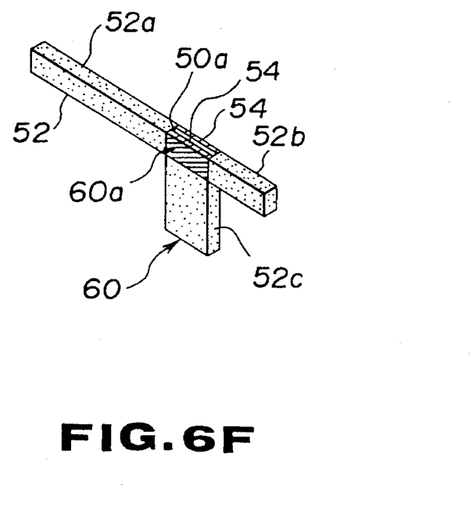

After this, the resulting composite is machined until a horizontal plane including a cutting line 56 is reached to cut off connecting portion 50b of the magnetic material block 50 to separate the shield plate precursors 50a' one from another. Then the composite is further machined to be cut along cutting lines 55 and 55' as illustrated in FIG. 6E to produce a shaped rod having a T-shaped cross section. This shaped rod is cut along cutting lines 57 as illustrated in FIG. 6E to a multiplicity of sections or spacer assemblies 60 each of which has a T-shaped cross section as shown in FIG. 6F, and then the sections are lapped. Thus, complete products of spacer assembly 60 can be obtained.

The spacer assembly and the various other elements of the magnetic head main body shown in FIG. 4 are assembled in a manner similar to the assembly steps of the conventional magnetic head main body to obtain a magnetic head main body 70 shown in FIG. 5. The magnetic head main body 70 is fixed or otherwise attached to the support plate 19 in the same assembly steps as the conventional method to complete a magnetic head.

In the magnetic head thus constructed, shield plate 50a in the spacer assembly 60 is arranged so as to only partially correspond to the portions of the core assemblies 1 and 21, respectively, near the magnetic gap therebetween so that crosstalk between the core assemblies 1 and 21 can be prevented, and leakage magnetic resistance which will occur between the core assembly 1 or 21 and the shield plate 50a can be reduced, resulting in reduced inductance. In other words, assuming that the inductance is kept at a constant level, the numbers of winding of the coils 10 and 28 can be increased, which contributes to the improvement of the recording and reproduction efficiency of the magnetic head. Further, the presence of the nonmagnetic material blocks 52a and 52b in the spacer assembly 60 makes the disk sliding surface flat overall the length of the core assemblies 1 and 21 in the direction of the arrow A in FIG. 2 without forming a depression or groove, with the result that the magnetic head can slide on a magnetic disk smoothly.

The aforementioned process for the fabrication of the spacer assembly 60 makes it possible to perform a so-called multiple fabrication, i.e., to fabricate a large number of spacer assemblies at a time from a single magnetic material block and single nonmagnetic material block. This assures a good productivity, and enables low cost production of a composite magnetic head for a high performance floppy disc drive which can prevent crosstalk and decrease inductance.

Embodiment 2

FIGS. 7A to 7E are perspective views illustrating the fabrication steps for fabricating the spacer assembly according to the second embodiment of the present invention.

Figure 7A:
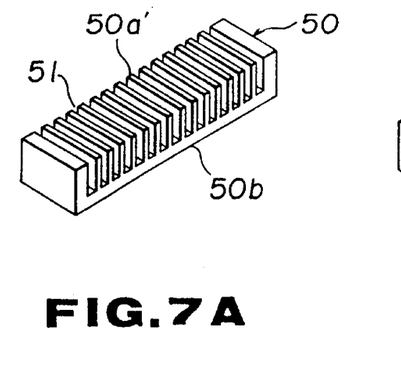
FIGS. 7A through 7E are perspective views illustrating the fabrication steps of the spacer in the magnetic head according to the second embodiment of the present invention.
Figure 7B:
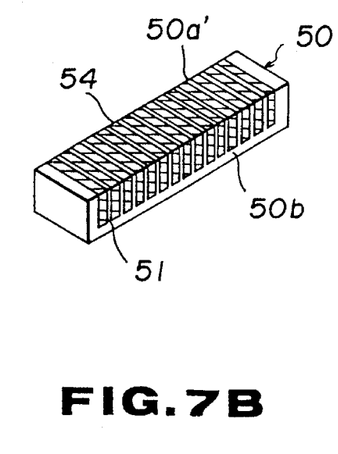

The magnetic material block 50 shown in FIG. 7A is formed with a plurality of grooves 51, together with a plurality of shield plate precursors 50a' connected together by the connecting portion 50b in the same manner as in the counterpart in Embodiment 1 above but somewhat larger in both the width and height than the counterpart in Embodiment 1. As shown in FIG. 7B, the joint material 54 is filled in the grooves 51.

Figure 7C:
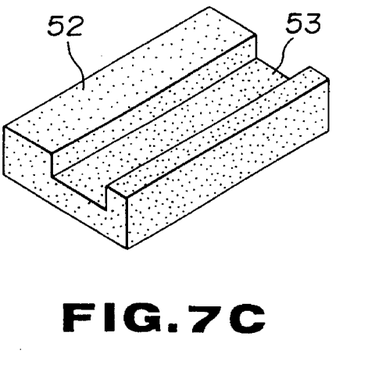

On the other hand, the nonmagnetic material block 52 shown in FIG. 7C is formed with the groove 53 in the same manner as in the nonmagnetic material block in Embodiment 1 above. The groove 53 has: correspondingly a larger dimension as the counterpart in Embodiment 1 so that the nonmagnetic material block 52 can be fitted in the groove 53 appropriately.

Figure 7D:
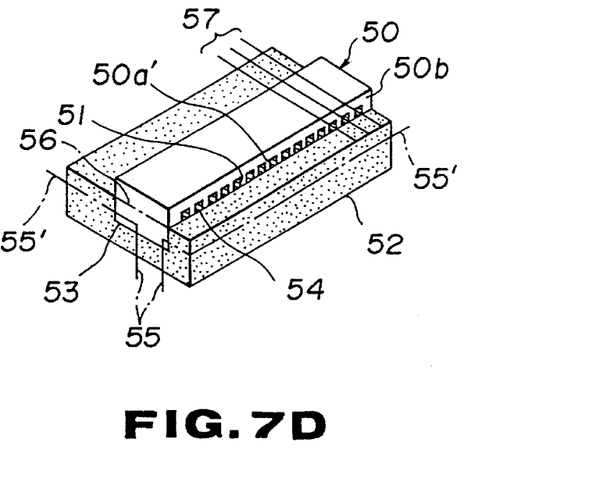

The block 50 with the grooves 51 filled with the joint material 54 is fitted upside down in the groove 53 of the nonmagnetic material block 52, with the connecting portion 50b and the bottoms of the grooves 51 being seen as emerging upper as shown in FIG. 7D. In this state, the block 50 is fixed temporarily, and then welded again so that the magnetic material block 50 and the nonmagnetic material block 52 can be joined together fixedly.

Figure 7E:
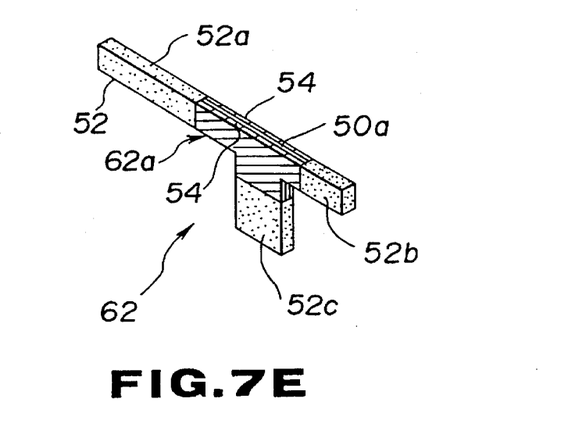

After this, the composite thus obtained is machined until a horizontal plane including a cutting line 56 is reached so as to cut off the connecting portion 50b of the magnetic material block 50 to separate the shield plate precursors 50a' one from another. Then the composite is further machined to be cut along cutting lines 55 and 55' as illustrated in FIG. 7D to produce a shaped rod having a T-shaped cross section. This shaped rod is cut along cutting lines 57 as illustrated in FIG. 6E to a multiplicity of sections each of which has a T-shaped cross section, followed by lapping to obtain a multiplicity of spacer assemblies 62, which has a dwindled T-shaped shield block 62a consisting of the shield plate 50a and two joint material layers 54 sandwiching the shield plate 50a, two nonmagnetic material blocks 52a and 52b joined to both ends of the horizontal beams of the dwindled T-shaped shield block 62a, and a nonmagnetic material block 52c joined to the leg portion of the shield block 62a, as shown in FIG. 7E. Thus, complete products of the spacer assembly 62 can be obtained.

As described above, a multiplicity of core assemblies 62 similar to those fabricated in Embodiment 1 can be obtained from a single magnetic material rod and a single nonmagnetic material rod at a time. The spacer assembly 62 and the various other elements of the magnetic head main body shown in FIG. 4 are assembled in a manner similar to the assembly steps of the conventional magnetic head main body to obtain a magnetic head main body 70 shown in FIG. 5. The magnetic head main body 70 is fixed or otherwise attached to the support plate 19 in the same assembly steps as the conventional method to complete a magnetic head.

The aforementioned process for the fabrication of the spacer assembly 62 makes it possible to perform a so-called multiple fabrication, i.e., to fabricate a large number of spacer assemblies at a time from a single magnetic material block and a single nonmagnetic material block. This assures a good productivity, and enables low cost production of a composite magnetic head for high performance floppy disc drive which can prevent crosstalk and decrease inductance.

In the magnetic head thus constructed, the shield plate 50a in the spacer assembly 62 has a larger width in the direction of the sliding surface 32 indicated by the arrow A in FIG. 5 than the spacer assembly 60 in Embodiment 1 and the portion of the spacer assembly 62 corresponding to the front cores 2b, 4b and 22b of the core assemblies 1 and 21, respectively, shown in FIG. 4, extends a little longer than the corresponding portion in the spacer assembly 60 in Embodiment 1, resulting in that the magnetic head with the spacer assembly 62 suffers less crosstalk than the magnetic head with the spacer 60 in Embodiment 1 but reduction of inductance is to a lesser extent than in the case of the magnetic head with the spacer assembly 60 in Embodiment 1.

Embodiment 3

FIGS. 8A to 8F are perspective views illustrating the fabrication steps for fabricating the spacer assembly according to the third embodiment of the present invention.

Figure 8A:
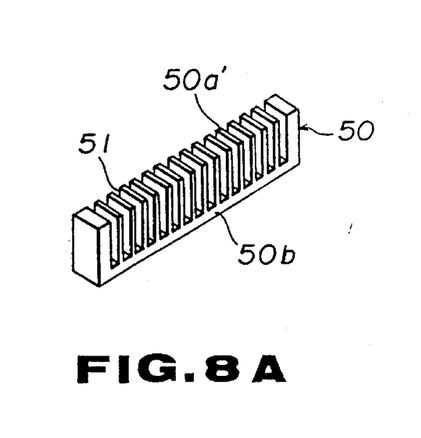
FIGS. 8A through 8F are perspective views illustrating the fabrication steps of the spacer in the magnetic head according to the third embodiment of the present invention.

The magnetic material block 50 shown in FIG. 8A is formed with a plurality of grooves 51, together with a plurality of shield plate precursors 50a' connected together by the connecting portion 50b in the same manner as in the counterpart in the preceding Embodiments 1 and 2 above but somewhat larger in height than the counterpart in Embodiment 1. The height of the magnetic material block 50 is identical to the thickness of the nonmagnetic material blocks 52 (52a and 52b).

Figure 8B:
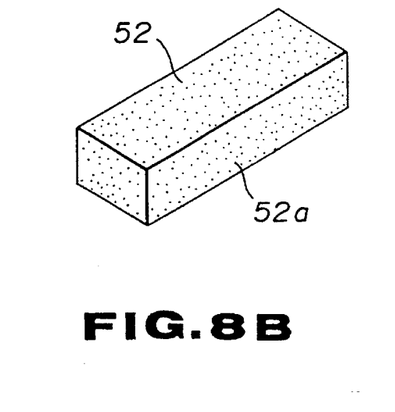
Figure 8C:
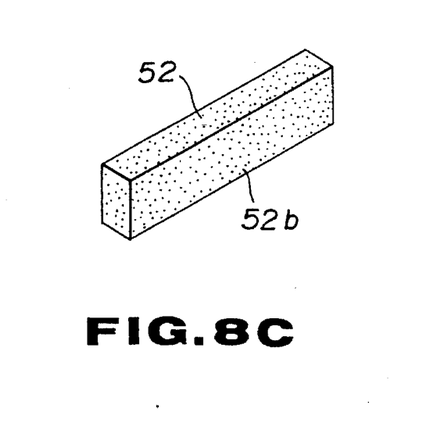
Figure 8D:
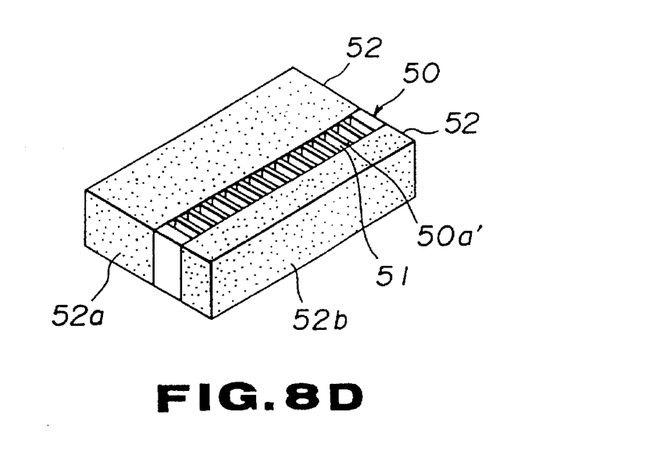

The nonmagnetic material block 52 shown in FIGS. 8B and 8C correspond to the nonmagnetic material blocks 52a and 52b, respectively, in the spacer assembly 60 and are rectangular in shape. As shown in FIG. 8D, the magnetic material block 50 is arranged between the two nonmagnetic material blocks 52a and 52b so that the block 50 can be sandwiched by the blocks 52a and 52b, with the upper surfaces of the nonmagnetic material blocks 52a and 52b and the spacer plate precursors 50a' being flush, and the blocks 50, 52a and 52b are temporarily fixed. Then the grooves 51 on the magnetic material block 50 are filled with the joint material 54 such as glass to joint the magnetic material block 50 with the nonmagnetic material blocks 52a and 52b, respectively.

Figure 8E:
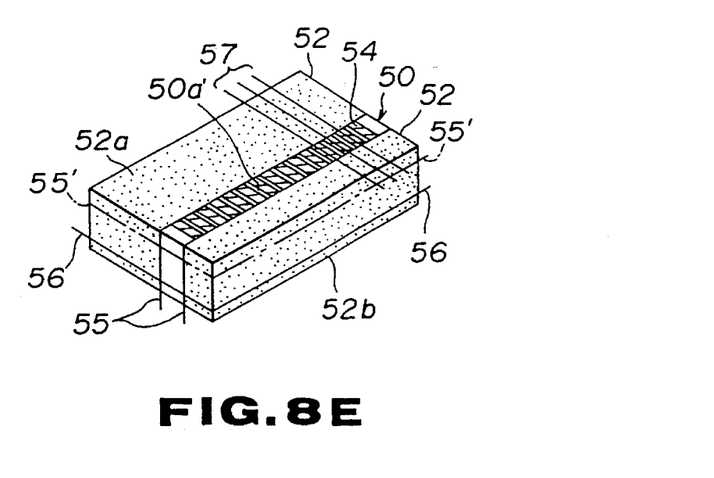
Figure 8F:
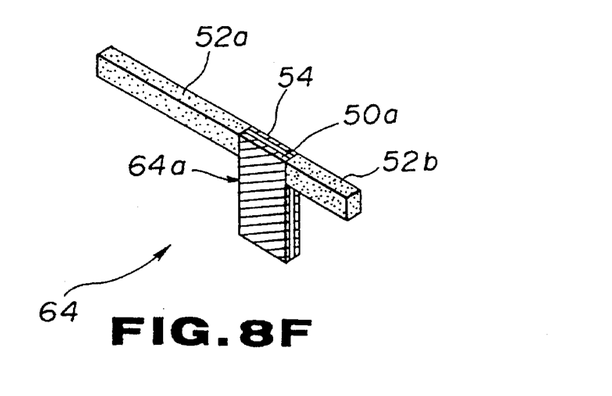

After this, the composite thus obtained is machined until a horizontal plane including a cutting line 56 is reached so as to cut off the connecting portion 50b of the magnetic material block 50 to separate the shield plate precursors 50a' one from another. Then the composite is further machined to be cut along cutting lines 55 and 55' as illustrated in FIG. 8E to produce a shaped rod having a T-shaped cross section. This shaped rod is cut along cutting lines 57 as illustrated in FIG. 8E to a multiplicity of sections each of which has a T-shaped cross section. Then the sections are lapped to obtain a multiplicity of spacer assemblies 64, which has a rectangular shield block 64a consisting of the shield plate 50a and two joint material layers 54 sandwiching the shield plate 50a, and two nonmagnetic material blocks 52a and 52b joined to both upper portions of the sides of the common-and-leg member 64a, as shown in FIG. 8F. Thus, complete products of the spacer assembly 64 can be obtained.

As described above, a multiplicity of core assemblies 64 similar to those fabricated in Embodiment 1 can be obtained from a single magnetic material rod and a single nonmagnetic material rod at a time. The spacer assembly 64 and the various other elements of the magnetic head main body shown in FIG. 4 are assembled in a manner similar to the assembly steps of the conventional magnetic head main body to obtain a magnetic head main body 70 shown in FIG. 5. The magnetic head main body 70 is fixed or otherwise attached to the support plate 19 in the same assembly steps as the conventional method to complete a magnetic head.

The aforementioned process for the fabrication of the spacer assembly 64 makes it possible to perform a so-called multiple fabrication, i.e., to fabricate a large number of spacer assemblies at a time from a single magnetic material block and a single nonmagnetic material block. This assures a good productivity, and enables low cost production of a composite magnetic head for high performance floppy disc drives which can prevent crosstalk and decrease inductance.

In the magnetic head thus constructed, the shield plate 50a in the spacer assembly 64 has a larger height, in other words, the portion of the spacer assembly 64 corresponding to the front cores 2b, 4b and 22b of the core assemblies 1 and 21, respectively, shown in FIG. 4, extends longer than the corresponding portion in the spacer assembly 60 in Embodiment 1, resulting in that the magnetic head with the spacer assembly 64 suffers less crosstalk than the magnetic head with the spacer 60 in Embodiment 1 but reduction of inductance ms to a lesser extent than in the case of the magnetic head with the spacer assembly 60 in Embodiment 1.

Embodiment 4

FIGS. 9A to 9E are perspective views illustrating the fabrication steps for fabricating the spacer assembly according to the fourth embodiment of the present invention.

Figure 9A:
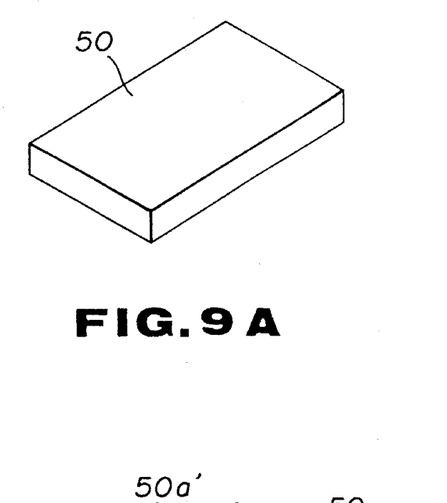
FIGS. 9A through 9E are perspective views illustrating the fabrication steps of the spacer in the magnetic head according to the fourth embodiment of the present invention.
Figure 9B:
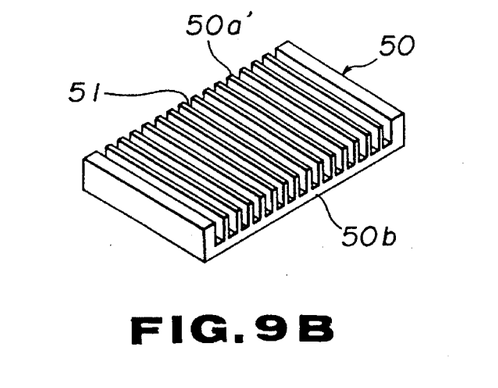
Figure 9C:
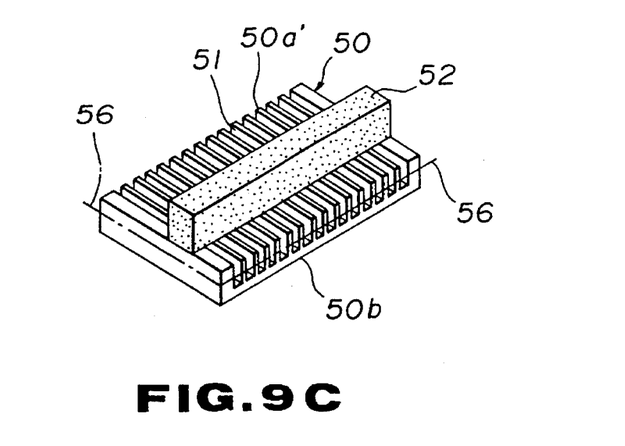

The magnetic material block 50 shown in FIG. 9A has a larger width than the magnetic material block used in the preceding Embodiments and is as large in width as the core assembly 1 in FIG. 4. As shown in FIG. 9B, the magnetic material block 50 is formed with a plurality of grooves 51, and a plurality of shield plate precursors 50a' are connected together by the connecting portion 50b in the same manner as in the counterpart in Embodiment 1 above. Then a rectangular nonmagnetic material block 52 is arranged on the processed magnetic material block 50 on the side grooves 51 are formed so as to cross them at right angles as shown in FIG. 9C, and temporarily fixed in this state.

Figures 9D, 9E:
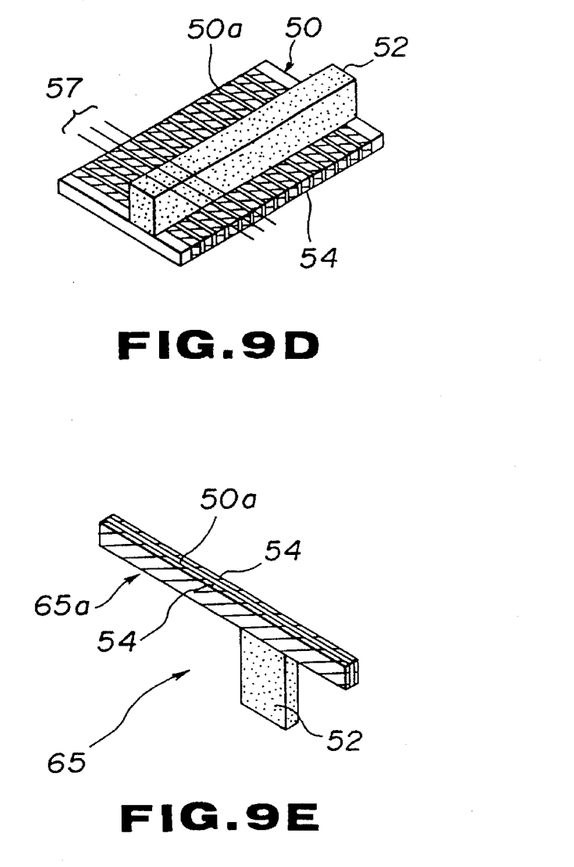

Then, the grooves 51 on the block 50 are filled with the joint material 54 such as glass to joint the nonmagnetic material block 52 with the processed magnetic material block 50 as shown in FIG. 9D.

After this, the composite thus obtained is machined until a plane including a cutting line 56 is reached so as to cut off the connecting portion 50b of the magnetic material block 50 to separate the shield plate precursors 50a' one from another. This shaped rod is cut along cutting lines 57 illustrated in FIG. 9D to a multiplicity of sections each of which has a T-shaped cross section, followed by lapping to obtain a multiplicity of spacer assemblies 65. The spacer assemblies 65 thus obtained each have a horizontal beam or shield block 65a consisting oil the shield plate 50a and two joint material layers 54 sandwiching the shield plate 50a, and a nonmagnetic material block 52 as a leg portion joined to the lower side of the horizontal beam 65a in a region corresponding to the front cores 2b, 4b and 22b of the core assemblies 1 and 21, respectively, shown in FIG. 4. Thus, complete products of the spacer assembly 62 can be obtained.

As described above, a multiplicity of core assemblies 65 similar to those fabricated in Embodiment 1 can be obtained from a single magnetic material rod and a single nonmagnetic material rod at a time. The spacer assembly 65 and the various other elements of the magnetic head main body shown in FIG. 4 are assembled in a manner similar to the assembly steps of the conventional magnetic head main body to obtain a magnetic head main body 70 shown in FIG. 5. The magnetic head main body 70 is fixed or otherwise attached to the support plate 19 in the same assembly steps as the conventional method to complete a magnetic head.

The aforementioned process for the fabrication of the spacer assembly 65 makes it possible to perform a so-called multiple fabrication, i.e., to fabricate a large number of spacer assemblies at a time from a single magnetic material block and a single nonmagnetic material block. This assures a good productivity, and enables low cost production of a composite magnetic head for high performance floppy disc drives which can prevent crosstalk and decrease inductance.

As compared with the spacer assembly 60 in Embodiment 1, the spacer assembly 65 which has shield plate 50a as long as the core assembly 1 in the direction of the sliding surface 32 indicated by the arrow A in FIG. 5, reduction in crosstalk is of substantially the same level as Embodiment 1, but reduction in inductance is to a lesser extent than in Embodiment 1.

Table 1 shows inductances and crosstalks with the conventional magnetic heads and those of Embodiments 1 and 4, respectively.

TABLE 1

|  | Change in Inductance | Crosstalk |
| --- | --- | --- |
| Conventional | 1 | −35 dB |
| Embodiment 1 | 0.78 | −30 dB |
| Embodiment 4 | 0.90 | −32 dB |

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A magnetic head comprising:

first and second front core assemblies, each front core assembly having at least one magnetic core forming respective magnetic circuits with respective magnetic gaps therein;

a spacer assembly sandwiched in a direction of a track width by said first and second front core assemblies, said first and second front core assemblies and said spacer assembly defining a sliding surface on which a magnetic recording medium slides, and which includes said respective magnetic gaps of each magnetic circuit of said first and second front core assemblies;

wherein at least a first portion of said spacer assembly is a laminate consisting of a magnetic material and a nonmagnetic material, and a remaining portion of said spacer assembly is a nonmagnetic material only;

wherein said spacer assembly remaining portion which is a non-magnetic material is arranged before and after said first portion of said spacer assembly with respect to the direction of slidable movement of the recording medium; and wherein said first portion of said spacer assembly consisting of said laminate is disposed along side said magnetic gaps of said core assemblies.

2. The magnetic head as claimed in claim 1, wherein each of said first and second front core assemblies comprises at least two front magnetic cores, said spacer assembly being disposed between respective front magnetic cores of said first and second front core assemblies.

3. The magnetic head as claimed in claim 2, wherein said spacer assembly comprises a sliding portion along said sliding surface on which said magnetic recording medium slides, and a leg portion extending in a direction perpendicular to said sliding portion, and wherein a part of said sliding portion contacts said leg portion and is made of said laminate.

4. The magnetic head as claimed in claim 2, wherein said spacer assembly comprises a sliding portion along said sliding surface on which said magnetic recording medium slides, and a leg portion extending perpendicular to said sliding portion, said leg portion being made of said laminate.

* * * * *